United States Patent Office 3,365,097
Patented Jan. 23, 1968

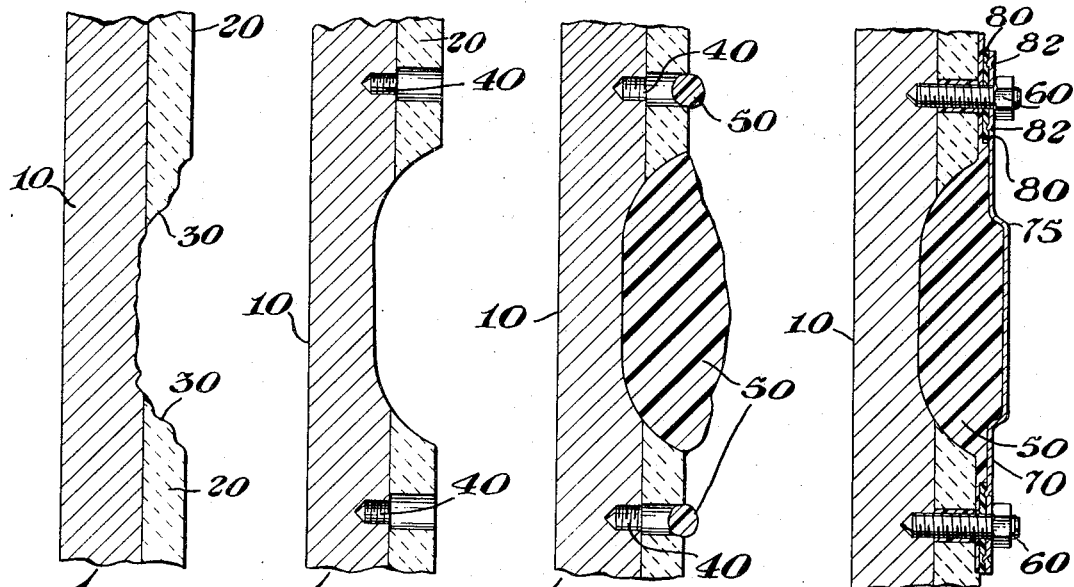
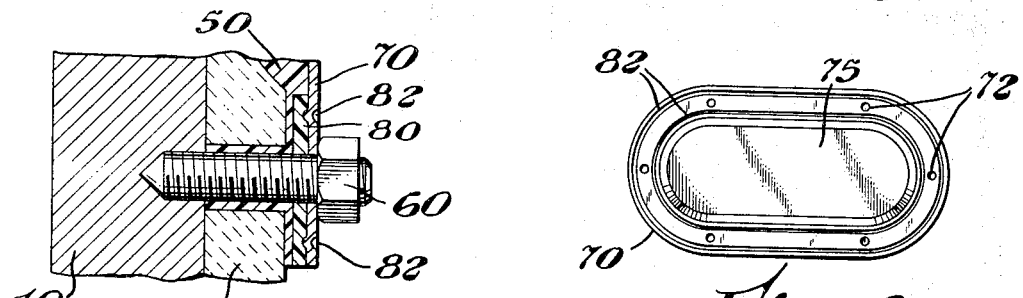
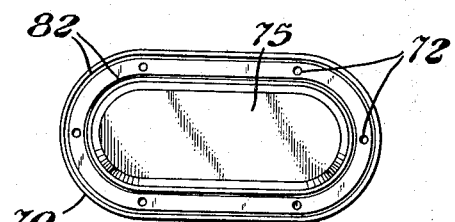
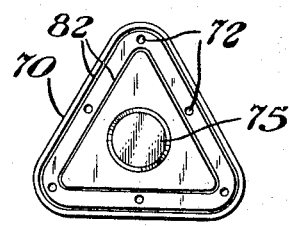
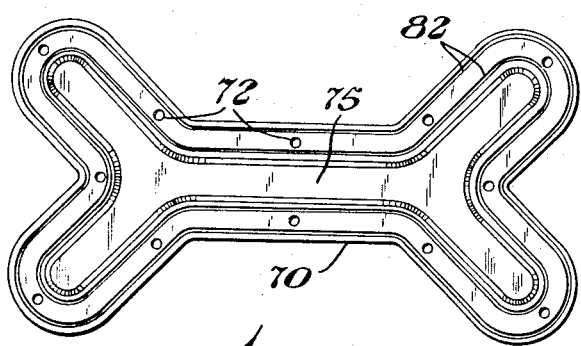
INVENTOR.
Raymond Burt Chase
BY
Griswold & Burdick
ATTORNEYS

3,365,097
REPAIR PATCH FOR LINED VESSELS
Raymond Burt Chase, Midland, Mich., assignor to The Dow Chemical Company, Midland, Mich., a corporation of Delaware
Filed Feb. 25, 1966, Ser. No. 530,049
1 Claim. (Cl. 220—63)

The present invention is concerned with patching refractory coatings, such as linings in refractory-lined metal articles which, beneath glass linings, are typically steel vessels.

Glass linings, often multi-layer glass linings, are applied to surfaces of metal vessels which are exposed to reactive chemical substances, typically acids, in order to render the surface less susceptible to degradation by chemical attack. These glass linings are sometimes broken, as by impact, thermal shock, release of internal stress, and the like. A large glass-lined reactor vessel such as is commonly used in the chemical industry, being very expensive, and often being involved in chemical processing which can be interrupted only at an expense which increases with the duration of the interruption, may require patching rather than replacement when possible, and patching both as quickly as possible and as nearly as possible permanently.

It is known to patch a break in a glass lining of a glass-lined metal reactor by machining the surfaces of the break relatively uniform, but yet leaving surface features in the form of a "tooth" whereby a filler resin has good occasion to adhere. As filler resin, it is known to use various curing filler resins such as the furan resins, the silicate resins, the epoxy resins, and so on. When the resin is expected to be exposed to influences that might weaken or remove it, it is known also to provide a metal cover, typically of tantalum, fitting snugly over and conforming to the surface of the resin—typically by applying such cover to the uncured, soft, resin whereby complete conformity of the surfaces is assured—the metal cover being held in place by studs or screws fitted into tapped holes in the wall of the reactor vessel. Routinely, such holes are "doped" by the introduction into them, prior to the introduction of the screw, of such resin as is used in repair of the patch. Also, gaskets, such as polytetrafluoroethylene gaskets, may encircle the patch and secure the metal cover at its edges.

For reasons that are not yet completely understood, such metal covers sometimes tend to separate from the underlying resin, and to facilitate separation of the resin from the vessel surface that is to be patched, despite the tendency of the resin to adhere closely to surfaces with which it comes in contact; and there have occurred a number of failures of patches prepared in this way resulting from the separation of the metal cover from the resin, and thereafter of the resin from the surface to be patched. The cause of the phenomenon is apparently unknown.

I have discovered a manner of forming a cover of a chemically resistant metal, such as tantalum, which, on all experience to the present time, including a large number of patches in which it has been tested under various use conditions, obviates this kind of failure.

The present invention will be more fully understood by reference to the figures of the annexed drawings. FIGURE 1 illustrates, generally, a break 30 in the glass lining 20 of a glass lined reactor vessel of which the glass lining 20 was originally applied adherent to steel wall 10 of the reactor vessel. It will be noted that, through the break, corrosion of the steel wall 10 has begun where chemical contents of the vessel had access to the unprotected metal. FIGURE 2 illustrates preparation of such break for the application of a patch, including a patch of the present invention. Preparation as here exemplified takes the form of machining, usually grinding as with an abrasive, through the glass wall and into the underlying metal, to achieve a relatively uniform surface which may yet bear surface features in the form of elongate grooves representing the roughness or "tooth" left by the action of a coarse grinding stone. At a distance from the edge of the prepared break there are prepared also holes 40 drilled with clearance through the glass and threaded into the metal 10 underlying the glass lining 20 of the reactor vessel whereby attachment studs can be affixed. It is noted that the prepared area should include all radial cracks and other features indicating spread of the break.

FIGURE 3 illustrates the prepared break shown in FIGURE 2 but that the break has been filled, in moderate excess, with a curable, that is, a "setting" resin 50 such as a catalyst setting resin. The tapped holes 40 are at the same time "doped" with small amounts of the same or similar catalyst setting resin.

Typical resins allow a workable interval of time from a few minutes to approximately 20 minutes or more during which they retain not only their plasticity but their ability to develop adherence to surfaces with which they are brought into contact. All work subsequent to the completion of the mixing of the resin filler, that depends upon plasticity of the resin, should be carried out within this interval of time.

The resins to be employed are known and the use of the cover of my invention imposes no new requirements. A versatile and often preferred resin is a modified furfuryl alcohol resin which may contain filler such as carbon flour, and may be catalyzed by one or more acidic substances of which p-toluenesulfonyl chloride is well known. Such resins tend to have good stability in the presence of a wide variety of substances. Epoxy resins are known and can be used. Silicate cements, based on powdered silica, sodium silicate, and, optionally, sodium fluosilicate with perhaps sodium fluoborate, in water, can be used when the chemical environment is suitable. Choice of a resin can be made upon criteria known to those skilled in the art.

FIGURE 4 shows the completed break with the metal cover 70 of the present invention in place. It will be noted that the metal cover 70 is held in place by studs (screws) with nuts 60. Although the head nuts are shown in FIGURE 4 as hexagonal, nut shape is not part of my invention and is a matter of choice. They may be ground nearly flush, or may be used in any known manner.

Also, beneath the stud nuts and engaging circumferential corrugations 82 in the metal patch there is usually a gasket 80.

When desired, this can be omitted, but superior patches are obtained when using a gasket 80. The gasket can be circumferential only, or can be a full face gasket. It will in any case be shaped to fit the patch. It can be of any suitable gasket material, but polytetrafluoroethylene is of superior versatility. Polytetrafluoroethylene alone, or the same reinforced with, for example, woven glass fibers, can be used. Such materials are articles of commerce. Also, other rubberlike substances can be used, such as the firm, partially flexible, polymers based on modified furfuryl alcohol. In any case, in the best practice of this invention, the gasket 80 is so positioned with respect to the grooves or corrugations 82 circumferential to the metal patch 70 that the corrugations 82 "bite" into the gasket 80, partially deforming it, as studs and nuts 60 are tightened. It will be apparent that studs 60 should be spaced peripherally closely enough together, depending upon the rigidity of the employed metal cover which in turn will depend upon its geometric configuration and the thickness of the metal, that pressure is applied throughout all points intervening the employed studs, enough to provide secure gasket engagement.

The metal cover 70 of the present invention differs from those of the prior art in that, relatively central with respect to the position of the resin-filled prepared break but of substantially less than the whole cover area, the shape of the metal cover of the present invention defines an umbo 75. This umbo, or elevated central area, is here shown as comprising walls sloping upward and away from the peripheral wall portion, and extending as a more or less uniform wall essentially parallel to the peripheral wall portions and at an elevation away from the path with respect thereto. Other umbonate shapes can be employed. Composite umbonate shapes employing a plurality or group of steps upward away from the patch can be employed. The umbo can be gently rounding or dome-shaped. It must always occupy less than the whole area of the metal cover, and, to the extent patch shape admits, must be relatively central thereto.

It is essential and critical to the present invention that the umbo, or elevation, 75 represent, with respect to the depth of the prepared break, an elevation of the surface of the metal cover; that the elevation be essentially central of the cover in its location; and that the elevation occupy a substantial part, but not all, of the area of the metal cover. Other than these umbo requirements, its shape, position of studs holding it into place, configuration, conformation, and identity of metal can be, within routine good patching practice, matters purely of convenience, and can be adapted to the nature of the chemical reaction or reacting substances or products therefrom or location in a vessel or the like. Generally, it will not be preferred to employ a single central stud in connection with the umbonate metal cover of the present invention but rather a plurality of studs essentially peripheral thereto, through holes 72 in metal cover 70 and cooperating holes in gasket 80. Generally it will be preferred to employ a peripheral gasket as the polytetrafluoroethylene gasket 80 here shown. For best results the resin filler should proceed out under the gasket, and should extend uniformly to and should fill the stud-clearance holes in the glass liner, as here shown.

The exact size, thickness, and chemical composition of the umbonate metal patch cover of the present invention will depend upon the chemical problems present where a patch is to be applied. Typically, tantalum has been the metal of preference for the metal patch and the studs and nuts; and polytetrafluoroethylene has been the resin of preference for the gasket. In embodiments that have been entirely satisfactory in many applications, the metal cover has been formed of tantalum which has been of a thickness of approximately 20 to $30/1000$ inch. However, when heavy use has suggested, metal up to a thickness of ⅛ inch has been satisfactorily employed. Stainless steel, nickel, and various alloys are sometimes usable. The metal is not critical to my invention but is to be chosen according to the chemical environment.

The nature and spacing of the studs or the like holding the patch into place may follow any good engineering procedure. In most instances, thickness of the steel wall of the reactor vessel admits drilling and tapping it for studs as shown. It is not preferred that stud holes pass through the vessel wall. Good results have been achieved when employing threaded studs in doped, threaded drill holes, spaced from one to three inches apart essentially entirely around the periphery of the patch. If, after securing in place, the stud projects beyond the nut that cooperates with it, the stud is ground smooth and the nut may be ground as well.

Welding is not preferred as a means to attach a patch to the interior of a glass lined vessel; the glass lining is usually irreparably injured by the local heating of welding.

While tantalum-covered resin patches have hitherto been regarded as temporary, patches prepared according to the present invention are regarded as permanent: in the sense that the patch, if properly applied, may be expected to last as long as, and with less likelihood of failure than, the intact portions of glass lining of the vessel thus patched.

Representative patches are commonly of approximately circular shape, and may range from two or three inches diameter to quite large. The largest patch made according to the present invention now known to the inventor was approximately 36 inches in diameter, and the tantalum cover with the umbo of the present invention was held in place by about 80 threaded tantalum studs. The resin filler under the tantalum cover was of a furan type; the cover was gasketed with polytetrafluoroethylene. Subsequent to the break in the glass lining and its repair with this large patch, this vessel has been in essentially continuous industrial use, with periodic examination for performance, for an extended period of time. Because of its unusual size this patch has been regarded as being definitive of the present invention, and it has been closely scrutinized for evidence of weakening or failure. No signs of failure have been observed.

The metal cover 70, and the entire patch, of FIGURES 1–4 herewith, are considered to be essentially circular in form. However, as is illustrated in FIG. 6, the patch is to be shaped to cover the break, and, when needed, an oval or elliptical form can be used. The indicated spacing of the holes 72 is not limiting but would depend upon the size of the patch and other factors as indicated hereinbefore.

FIG. 7 illustrates a patch to cover a break of which the outline is triangular or nearly so. Umbo 75 is shown as circular but, depending on the size of the patch and convenience in fabrication, can be of other shape, such as triangular, square, oval, rectangular, or the like. The method to be used in forming of the umbo is not part of my invention and can follow any good metal forming practice.

It will be noted that the indicated patches need not lie all in the same plane or in parallel planes; when a break proceeds along a curved surface such as the interior wall of a cylindrical vessel, the patch conforms. When a break proceeds over a wall surface defining a distinct angle, as the intersection between wall and floor, the patch follows the angle.

Tantalum is expensive and it will usually be desired to inspect the break and design a patch to fit relatively closely to the area and shape of damage. Thus, in FIG. 8, the patch 70 is of a composite shape which is to cover an approximately central damaged area together with cracks proceeding therefrom, all of which are to be ground, as hereinbefore indicated, to provide good basis for the filler resin, gasket, studs, and patch.

The plane shape of the patch and the plane shape of the umbo of the patch are not critical; that the umbo defining an elevation be present and, whatever its shape, be relatively central to the metal cover, is at the heart of this invention.

FIGURE 5 illustrates in detail the edge of a patch which can be a patch according to this invention. The illustration shows that resin filler 50 proceeds uniformly from the filled, broken area under gasket 80 and into the stud holes surrounding stud 60 to fill any excess volume of such holes: the patch 70, defining peripheral crimps 82 is in intimate conforming contact with resin filler 50 up to gasket 80, and engages gasket 80 by deforming it under crimps 82 by means of pressure exerted through tightening of studs and nuts illustrated together herein as 60.

For purposes of illustration the studs and nuts have been shown intact; routinely they may be applied and then ground to a smooth surface which does not readily accumulate deposits of chemical substances from vessel contents. The stud nuts are here shown "upside down"

with respect to the working surface. This is routine practice.

I claim:
1. In a cover of metal to be affixed over and conforming with a resin filler in completion of a patch of a break in a refractory lining of a refractory lined article, the improvement that the shape of the said cover defines an essentially central umbo.

References Cited

UNITED STATES PATENTS

| | | | |
|---|---|---|---|
| 2,833,631 | 5/1958 | Rossheim et al. | 220—63 XR |
| 3,236,407 | 2/1966 | Zelman et al. | 220—24 |

THERON E. CONDON, *Primary Examiner.*

G. T. HALL, *Assistant Examiner.*